(12) United States Patent
Katz et al.

(10) Patent No.: US 9,871,809 B2
(45) Date of Patent: Jan. 16, 2018

(54) REVERSION OF SYSTEM OBJECTS AFFECTED BY A MALWARE

(71) Applicant: Shine Security Ltd., Herzlia Pituach (IL)

(72) Inventors: Itay Katz, RaAnana (IL); Ianir Ideses, RaAnana (IL); Ron Porat, RaAnana (IL); Alon Blayer-Gat, Kiryat-Ono (IL); Oren Farage, Ramat-Gan (IL)

(73) Assignee: Shine Security Ltd., Herzlia Pituach (IL)

( * ) Notice: Subject to any disclaimer, the term of this patent is extended or adjusted under 35 U.S.C. 154(b) by 76 days.

(21) Appl. No.: 14/468,374

(22) Filed: Aug. 26, 2014

(65) Prior Publication Data

US 2015/0058988 A1    Feb. 26, 2015

Related U.S. Application Data

(60) Provisional application No. 61/869,775, filed on Aug. 26, 2013.

(51) Int. Cl.
*H04L 29/06* (2006.01)

(52) U.S. Cl.
CPC ........ *H04L 63/1416* (2013.01); *H04L 63/145* (2013.01)

(58) Field of Classification Search
CPC ................................ G06F 17/30; H04L 63/00
See application file for complete search history.

(56) References Cited

U.S. PATENT DOCUMENTS

| | | | |
|---|---|---|---|
| 6,735,772 B1 * | 5/2004 | MacPhail | G06F 9/542 706/28 |
| 6,973,577 B1 | 12/2005 | Kouznetsov | |
| 8,065,728 B2 | 11/2011 | Wang et al. | |
| 8,190,868 B2 | 5/2012 | Schneider | |
| 8,401,982 B1 * | 3/2013 | Satish | G06F 21/566 706/12 |
| 2004/0187023 A1 | 9/2004 | Alagna et al. | |
| 2009/0070878 A1 | 3/2009 | Wang et al. | |
| 2010/0107249 A1 | 4/2010 | Krig | |
| 2010/0132038 A1 | 5/2010 | Zaitsev | |

(Continued)

FOREIGN PATENT DOCUMENTS

WO    WO 2013/164821    11/2013

OTHER PUBLICATIONS

Official Action dated Dec. 14, 2015 From the US Patent and Trademark Office Re. U.S. Appl. No. 14/474,143.

(Continued)

*Primary Examiner* — Edward Zee
*Assistant Examiner* — Leynna Truvan (57) ABSTRACT

A computerized method of reverting system data affected by a malware. The method comprises monitoring, in run time, a plurality of events of a plurality of processes executed by an operating system (OS) running on a computing device, logging in an event log, in run time, the plurality of events, classifying, in run time, a first process of the plurality of processes as a malware, identifying a set of events of the first process from the plurality of events using the event log, and reverting, in response to the classification, at least one system object hosted in the computing device to remove an effect of the set of events on the OS.

17 Claims, 4 Drawing Sheets

(56) References Cited

U.S. PATENT DOCUMENTS

| | | |
|---|---|---|
| 2011/0023115 A1 | 1/2011 | Wright |
| 2011/0047620 A1 | 2/2011 | Mahaffey et al. |
| 2012/0005115 A1 | 1/2012 | Hofberg et al. |
| 2013/0298244 A1 | 11/2013 | Kumar et al. |
| 2013/0339186 A1 | 12/2013 | French et al. |
| 2014/0115703 A1 | 4/2014 | Penton et al. |
| 2015/0067859 A1 | 3/2015 | Katz et al. |
| 2015/0135262 A1 | 5/2015 | Porat et al. |

OTHER PUBLICATIONS

Official Action dated Jun. 28, 2016 From the US Patent and Trademark Office Re. U.S. Appl. No. 14/474,143.
Official Action dated Dec. 30, 2016 From the US Patent and Trademark Office Re. U.S. Appl. No. 14/474,143. (20 pages).

* cited by examiner

REVERSION OF SYSTEM OBJECTS AFFECTED BY A MALWARE

RELATED APPLICATION

This application claims the benefit of priority under 35 USC 119(e) of U.S. Provisional Patent Application No. 61/869,775 filed Aug. 26, 2013, the contents of which are incorporated herein by reference in their entirety.

BACKGROUND

The present invention, in some embodiments thereof, relates to malicious activity detection and/or handling and, more specifically, but not exclusively, to systems and methods of malicious activity detection and/or handling based on event monitoring.

Conventional anti-virus (AV) applications attempt to prevent harmful or malicious transmissions such as viruses and worms from infiltrating a computing device. Typically, such applications operate on a network gateway or host and monitor incoming traffic. Conventional AV applications, whether server or host based typically rely on a so-called fingerprint matching implementation. Such a fingerprint matching mechanism aggregates a set of unique indicators, or signatures, exhibited by known malicious transmissions. The unique indicators typically represent portions of files which a particular AV vendor has previously identified as malicious, such as a signature copy and used from a particular byte range in the file, or a hash computed over a predetermined portion of a file. The result is a signature value substantially shorter that the entity (file) it represents yet which has a high likelihood of matching a signature computed from another similar instance of the file. A set of signatures of known malicious transmissions is readily comparable to an incoming transmission to determine malicious content in the incoming transmission.

During the last years system and methods for integration of behavioral and signature based security have been developed.

SUMMARY

According to some embodiments of the present invention, there is provided a computerized method of reverting system data affected by a malware. The method comprises monitoring, in run time, a plurality of events of a plurality of processes executed by an operating system (OS) running on a computing device, logging in an event log, in run time, the plurality of events, classifying, in run time, a first process of the plurality of processes as a malware, identifying a set of events of the first process from the plurality of events using the event log, and reverting, in response to the classification, at least one system object hosted in the computing device to remove an effect of the set of events on the OS.

Optionally, the classifying comprises calculating a plurality of scores each for another of the plurality of processes according to an analysis of respective associated events from the plurality of events in run time and performing the classifying according to the plurality of scores.

More optionally, the reverting comprises a reverting action selected according to a score from the plurality of scores of the first score.

Optionally, the reverting comprises deleting a file added by the first process.

Optionally, the reverting comprises deleting the at least one system object; further comprising identifying a regeneration of the at least one system object and preemptively blocking the regeneration.

Optionally, the reverting comprises deleting a registry value added by the first process.

Optionally, the reverting comprises disabling the first process.

Optionally, the reverting comprises identifying a match between the at least one system object and at least one system object template and using the at least one system object template to revert the at least one system object for removing the effect on the OS.

The computerized method of claim 8, wherein the at least one system object template is at least one specific system object template adapted for the OS.

More optionally, the at least one system object template is at least one generic system object template adapted for an update version of the OS.

According to some embodiments of the present invention, there is provided a system of reverting system data affected by a malware. The system comprises a memory hosting a an event log wherein a, a processor, a threat monitoring module which monitors, in run time, a plurality of events of a plurality of processes executed by an installed operating system (OS) running on a computing device and logs the plurality of events in the event log, the threat monitoring module uses the processor to classify, in run time, a first process of the plurality of processes as a malware and to identify a set of events of the first process from the plurality of events using the event log, and a data reverting module which reverts at least one system object hosted in the computing device and affected by the set of events in response to the classification.

Optionally, the system comprises a generic template database which stores a plurality generic system object templates of a plurality of different versions of an operating system, the data reverting module selects at least one of the plurality generic system object templates for a replacement of the at least one system object according to a version of the installed OS.

Optionally, the system comprises a specific template database which stores a plurality specific system object templates generated to replicate a plurality of different system objects of the installed OS, the data reverting module selects at least one of the plurality specific system object templates for a replacement of the at least one system object.

According to some embodiments of the present invention, there is provided a computerized method of repairing damage caused by malware operations. The method comprises monitoring in run time a plurality of events of a plurality of processes executed by an operating system (OS) running on a computing device, classifying, in run time, a first process of the plurality of processes as a malware by an analysis of a set of events associated with the first process from the plurality of events, detecting, in run time, an additional event performed by the first process on the computing device, and reverting at least one system object hosted in the computing device and affected by the additional event.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to malicious activity detection and/or handling and, more specifically, but not exclusively, to systems and methods of malicious activity detection and/or handling based on event monitoring.

According to an aspect of some embodiments of the present invention there are provided methods and systems of remediating a malware infected system by identifying logged events of a process classified as a malware and reverting one or more system object(s) affected by these events. The methods and systems involve continuously monitoring events of a plurality of processes executed by or using a target system hosted on a computing device, for example an operating system or a file system, detecting a process classified as a malware, for example based on a run time scoring, and reverting system objects affected by the events of the classified process. The system objects may be files, registry values, and setting values of a target system.

According to an aspect of some embodiments of the present invention, there are provided methods and systems for identifying, in run time, an event performed by a process classified as a malware and reverting, in run time, the effect thereof on one or more system objects. As used herein, a process classified as a malware may be a process scored with a score indicative of a probability of being a malware above a threshold, optionally predefined.

Optionally, the reversion of system objects affected by the classified process in any of the above outlined embodiments is performed using generic or specific system object templates stored in one or more database(s), for example local or remote databases. For example, system object templates may be generic system object templates based on uninfected reference files and/or values (e.g. registry or setting) of an operating system. Optionally, the database stores system object templates of system objects from different versions of an operating system and/or from different operating systems. Additionally or alternatively, the database stores specific system object templates which are based on system objects of an operating system adapted after the installation thereof on the monitored computing device. In use, system objects affected by the classified process are replaced with matching system objects from the database(s).

Optionally, the reverting is performed by reversion operations adapted to the level of the treat from the classified process and/or the score of the classified process.

The above reversion methods and systems allow "healing" (or mending) a target system infected with a malware regardless of the removal of the malware and/or the deletions of malware files. The above reversion methods and systems treat damaged system objects, such as file, and does not just delete or quarantine infected files. The reversion operations are designated to be performed after a malicious activities are completed and/or during the performance of malicious activities. The reversion operations may not triggered in response to identification of a signature of a process but rather on a score that is given thereto from an analysis of its events.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
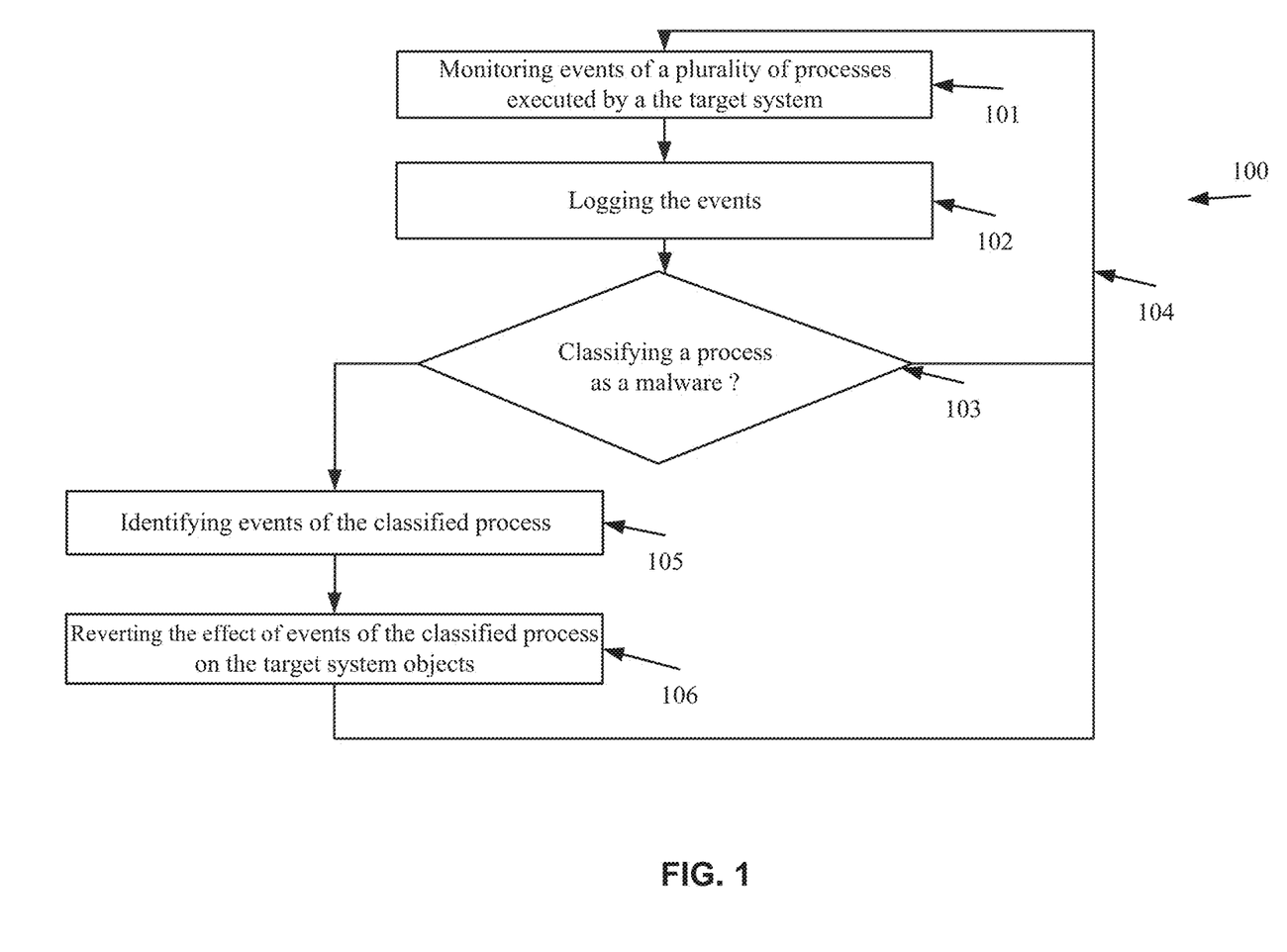
FIG. 1 is a flowchart of a method of identifying events of a malware process, based on a process score and/or thread score and/or event score, according to some embodiments of the present invention.

Reference is now made to FIG. 1, which is a flowchart 100 a method of identifying events of a malware process, based on a process score, threat score and/or event score, for instance a malware and reverting one or more system object(s) effected by the events, for example files, and/or operating system states, according to some embodiments of the present invention.

Events are optionally identified based on run time monitoring, for instance as described in international patent application No. PCT/IL2013/050366, which is incorporated herein by reference.

Figure 2:
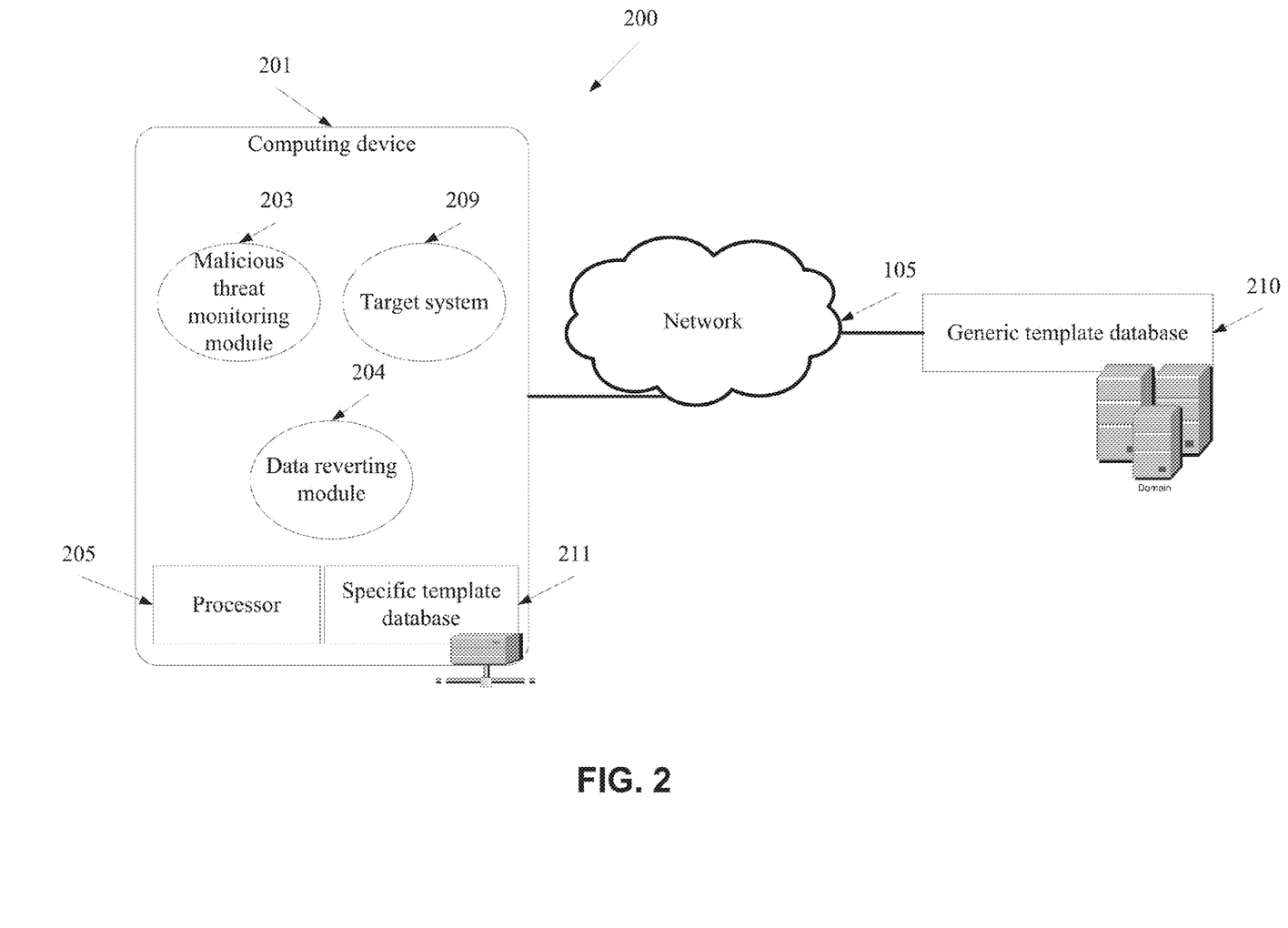
FIG. 2 is a schematic illustration of a system of reverting target one or more system object(s) affected by malware events in a computing device, according to some embodiments of the present invention.

Reference is also made to FIG. 2, which is a schematic illustration of a data reverting system 200 of reverting one or more system object(s) affected by malware events in a computing device 201, according to some embodiments of the present invention. As used herein, one or more system object(s) includes OS files, file system values, setting values, registry entries, OS related dynamic link libraries (DLLs) and/or objects accessed or executed by the target system. The data reverting system 200 optionally supports the data reverting methods depicted in FIGS. 1 and 4 when implemented in an operating system based computing device having one or more processor 205, for example a server, a laptop, a desktop, a tablet, a Smartphone, Smart TV, a Car computer, a Smart watch, a virtual machine hosted in a network node and/or the like. The data reverting system 200 includes a malicious threat monitoring module 203 and a data reverting module 204 hosted, either permanently and/or temporarily, in the computing devices 201. As further described below, the malicious threat monitoring module 203 scores and/or classifies, in real time, processes which are executed by a target system running on the computing devices 201, identifies one or more suspected events of these processes, and reverts accordingly one or more system object(s) affected by the events. As further described below, the data reverting module 204 reverts one or more system object(s) of a monitored system executed on the computing device 201, for example an operating system (OS), optionally including any file system, directory, registry and/or setting, referred to herein as a target system 209.

Optionally, the data reverting system 200 includes or connected to a generic template database 210 via a network 105, for example a server based database that stores a plurality of uninfected OS template files. These generic system object templates may be used for reverting one or more system object(s), for example as described below. These generic system object templates may be system objects, such as files and/or values, which are suitable for the target system 209. The generic template database 210 optionally stores generic system object templates per version and/or update version of a plurality of different possible target systems 209, for instance operating systems. The generic template database 210 may be a cloud server or a local server in an organizational network. A generic system object template may be a copy of a certain version of an OS object, such as an OS file or a copy of a certain image thereof (e.g. ghost or a part thereof). The generic template database 210 may acquire a requested generic system object template from a demo OS executed on a client, for instance on a web accessible desktop or laptop identified as uninfected.

Optionally, the generic system object templates in the generic template database 210 are divided according to their OS update level. In such embodiments clusters of different generic system object templates exist. Each cluster is associated with a different OS update level and therefore contains a certain set of generic system object templates pertaining to files and settings of the respective OS update level reflecting, inter alia, changes in default setting(s) in the target system 209. OS update level cluster may be formed per major update, for instance service pack update, and/or a minor update, for instance periodical update.

Additionally or alternatively, the data reverting system 200 includes or connected to a specific template database 211, for example a dataset locally stored in the local memory of the computing device 201. The specific template database 211 includes machine specific system object templates, such as templates of files and/or values of the OS that is running on computing device 201, for example the target system. These specific system object templates may be edited or otherwise adapted system object templates which are suitable for the target system 209 itself only, for example generic system object templates which have been modified during the run time of the target system 209 and/or personalized for its operator(s).

A machine specific template OS dataset of machine specific system object templates may be generated by matching the signatures of system objects of a target system 209 monitored by the data reverting system 200 and signatures of system object templates of a suitable OS update level and/or version, for instance from the generic template database 210, to identify which system objects have been adapted or otherwise personalized. The matching may be performed using cryptographic hash algorithms, creating the updated dataset of specific system objects which are different from respective generic system objects. This matching may be performed as part of the installation process of the data reverting system 200. Optionally, the machine specific template OS dataset is updated or replaced periodically, for example by repeating the above matching process.

Optionally, a snapshot of the target system 209 is created in case a system object is changed while the system is offline and no matching with the system object templates of the target system 209 could have been performed, for example by mounting a storage to a secondary machine or booting from a secondary boot device. Past versions of each system object may be kept for a certain period, for example a day, a week, a month, a year or any intermediate or longer period.

An access to the machine specific template OS dataset 211 is optionally protected for authentication, using cryptographic algorithms for example, so that third party interferences are avoided. The integrity of each template OS dataset is done using digital signature for example or using similar standard. The computing device determines the validity of each signature.

First, as shown at 101, during the run time of the target system, events executed by a target system 209 running on a target computing device, of each of a plurality of processes, are monitored, for example by the malicious threat monitoring module 203. As used herein, an event means an action or occurrence detectable by another program. An event triggered by a process may be referred to herein as an event of the process, for example events to communicate a task status.

Optionally, the malicious threat monitoring module 203 channels events of the target system running on the hosting computing device 201 to an event processor which analyzes the events. Optionally, events are channeled from the application program interfaces (APIs) of the operating system (OS) of the hosting computing device 201, for example by utilizing API calls and/or API aggregators. Additionally or alternatively, the malicious threat monitoring module 203 channels events using a kernel driver, optionally, a mini filter kernel driver. The kernel driver initiates before all the modules of the OS is loaded with the lowest altitude possible, and collects events in the kernel level. Such a kernel driver has a higher priority and more authorizations than a process executed by the OS (application level).

Optionally, events, for example entries, which are identified as unmalicious events, are filtered, also referred to herein as purged, and/or classified as unmalicious events. Optionally, the unmalicious events are identified according to a match with unmalicious event dataset, a structure holding restructured events that were tagged as unmalicious, for example not related to a known attack pattern. The unmalicious event dataset is optionally generated as described in International Patent Application No. PCT/IL2013/050366, which is incorporated herein by reference.

As shown at 102, the events, optionally unfiltered events, are recorded as entries in an event log. The event log may be any dataset or other mathematical or computational structure such as vector or cluster, The event log may document events detected during a monitoring period, for example since the initiation of the monitoring and/or during a certain defined period. The event log is optionally updated in real time.

For example, an event entry in the event log has the following format (structure):

Process Name, Operation, Path, Result, Event Class, Image Path, User, Command Line, Category.

The event log may document events detected during a monitoring period, for example since the initiation of the monitoring and/or during a certain defined period, for example the last 1, 3, 6, 12 and 18 month(s) or any intermediate or longer term. The event log is optionally updated in real time. By logging events, as part of the detection scheme, the data reverting system 200 tracks and keeps a trail of events indicative of any suspicious activity performed by any of the processes running on the target computing device 201.

As shown at 103, in run time, the plurality of processes are classified and/or scored, for instance based on a classification and/or scoring given to the monitored and optionally logged events. Classifying a process as a malware may be an outcome of scoring the process with a malware risk score above a threshold. As shown at 104, events are monitored and logged continuously.

While each event may not constitute independently a malicious act, an event detection algorithm, using machine learning (ML) techniques, may be used to aggregate events and determine a score of each process based on events associated therewith, for instance as described in international patent application No. PCT/IL2013/050366, which is incorporated herein by reference. For example, when a score of a process passes a certain threshold, the data reverting system 200 tags the process as malware.

For example, a deterministic event score indicative of an estimated threat level may be calculated per event, for example according to the classification. For example, an event score is propagated to all of the events of a certain process based on the scoring that is given to one of the events of the certain process. Optionally, event scores are accumulated, for example an event may inherit event scores from one or more parent events and may pass on its event score children events. Optionally, event scores are used for calculating a process score for a process related to the respective events. For example, scoring may be performed as follows:

If Event class is "Registry" and the event Operation is "RegSetValue" and the event path is "\System\CurrentControlSet\Control . . . " then label then classify this event as "AutoStart" and apply a scoring function.

Scores and classifications are propagated and attached to the entity representing the process emitting the specific event.

Optionally, a deterministic process score is given to each group of events representing a common process. The score is optionally aggregated, for example passed on from children process(es) to a parent process that adds their scores. Optionally, a process score is determined according to the respective event scores. In such embodiments, the process score is a sum of the respective event scores and optionally a current process score and optionally children score(s).

As shown at 105, processes are classified. When a process is classified as a malware, events of the classified process are optionally identified by reviewing the entries of the event log.

Optionally, a list of the events of the classified process is created. The list may be represented in any dataset.

Now, as shown at 106, during a reversion process, target system 209 system object(s) affected by the logged events of the classified process are reverted, for instance by iteratively reverting system object(s) damaged by each event in the list of the events, for instance by a first in first out (FIFO) or last in first out (LIFO) order. For instance, the system object(s) are edited so as reflect a state wherein the events were not executed by the target system. The challenge in this may be restoring the target system 209 to a pre-infection resource state, namely to its state before the classified process has been executed.

Optionally, the reverting includes fixing a damage caused to the target system 209 by additive operations (events) of the classified process. For example, if a resource, a system object, is added to the target system 209 by an event of a process classified as a malware, it is deleted.

Optionally, the reverting includes fixing a damage caused to the target system 209 by modification operations (events) of the classified process. Modification operations may include any deletion operation, a change of settings, for example, registry settings, and change of files, for example persistent code injection.

Figure 3:
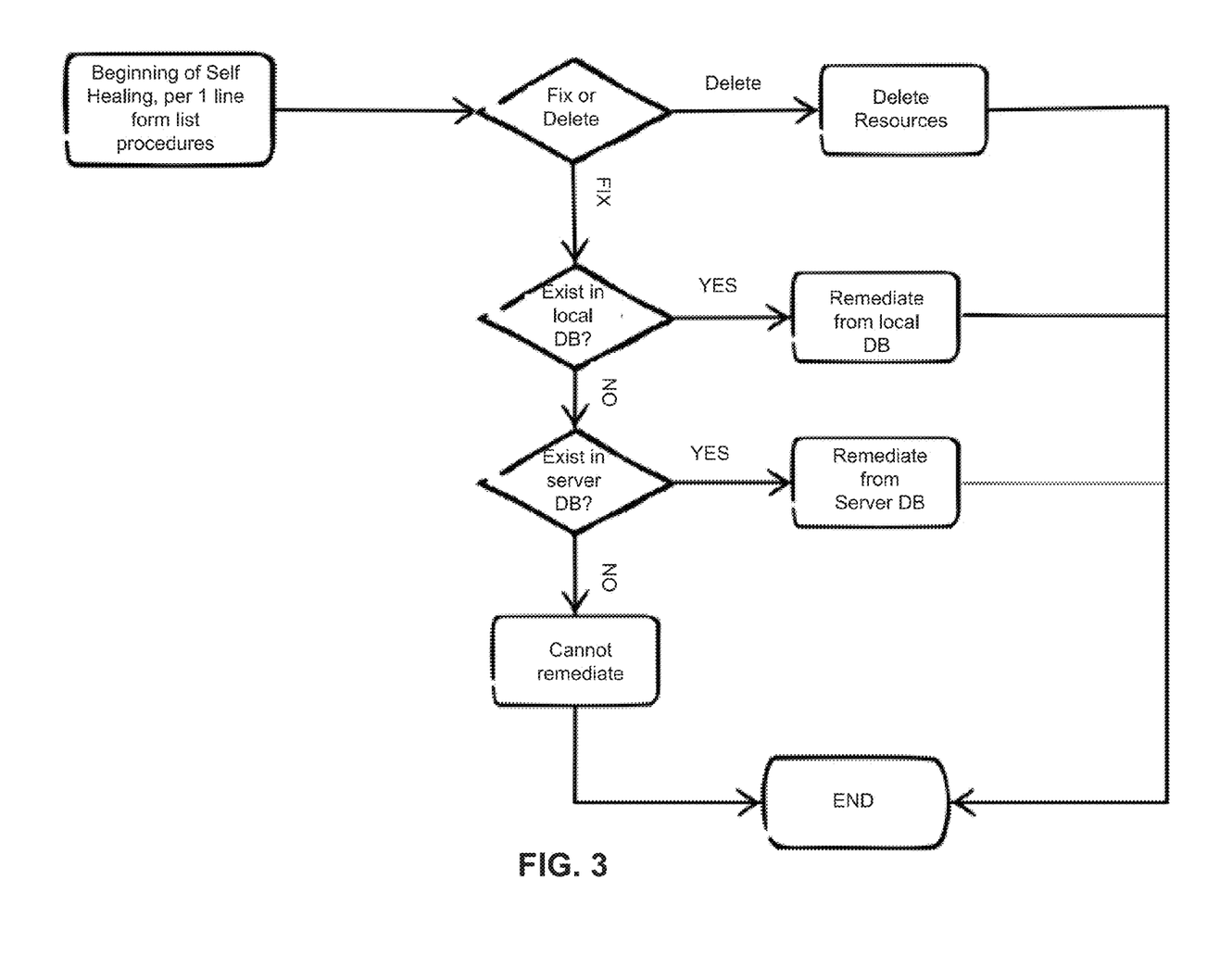
FIG. 3 is a flowchart of a process for selecting a generic system object or a specific system object for replacing a damaged system object, according to some embodiments of the present invention.

In such embodiments, a modified system object may be replaced with a specific system object if a respective specific system object template is found in the specific template database 211 and replaced with a generic system object from the generic template database 210 if a respective specific system object template is not found in the specific template database 211 and found in the generic template database 210. For example, FIG. 3 depicts a flowchart of a process for selecting a generic system object or a specific system object for replacing a damaged system object, according to some embodiments of the present invention.

Optionally, data, for instance generic system object templates, is copied from the generic template database 210 and/or the specific template database 211 and used to replace one or more system damaged object(s) of the target system 209. For example, the generic template database 210 is accessed by the data reverting module 204 that copies generic system object templates such as registry values of possible update versions of the target system 209. The generic system object templates are optionally selected based on the update version of the target system 209. Settings are optionally kept in a default state for the specific OS update level. For example, the data reverting module 204 compares a signature of a system object such as a file or value which has been affected by an event of the classified process and the system object templates.

Optionally, data, for instance specific system object templates, is copied from the specific template database 211 and used to replace one or more damaged system object(s) of the target system 209. For example, the specific system object templates include local OS files and/or registry settings.

In an exemplary scenario, the target system 209 executes a malware. An event of the malware is a write commend to write a malware DLL file to a directory of the target system 209, replacing a system DLL File and triggering the changing of a shell setting in the registry of the target system 209 from explorer.exe to a binary file: (HKEY_LOCAL_MACHINE\SOFTWARE\Microsoft\WindowsNT\CurrentVersion\Winlogon\Shell).

During the reversion process, an event indicating the creation of the malware DLL and an event indicating the changing of the shell setting are identified and respective system object templates are searched for in the databases 210, 211. In this example, a system object template of the replaced system DLL file is identified in the generic template database 210 and used to replace the malware DLL and a system object template of the shell setting is identified in the specific template database 211 and used for restoring the registry.

In another exemplary scenario, an event of the malware changes domain name service (DNS) settings of the target system 209 by editing HOSTS file and/or any DNS settings in the target system 209. Such a change allows an attacker to redirect a connection to a known site, such as worldwidewebdotgoogledotcom, to his own server.

During the reversion process the list is followed to identify, for example in the specific template database 211, a version of the specific HOSTS file of the target system 209. If such a file does not exist in the specific template database 211, the generic template database 210 is contacted to restore a generic version of the HOSTS file for the respective OS version.

Figure 4:
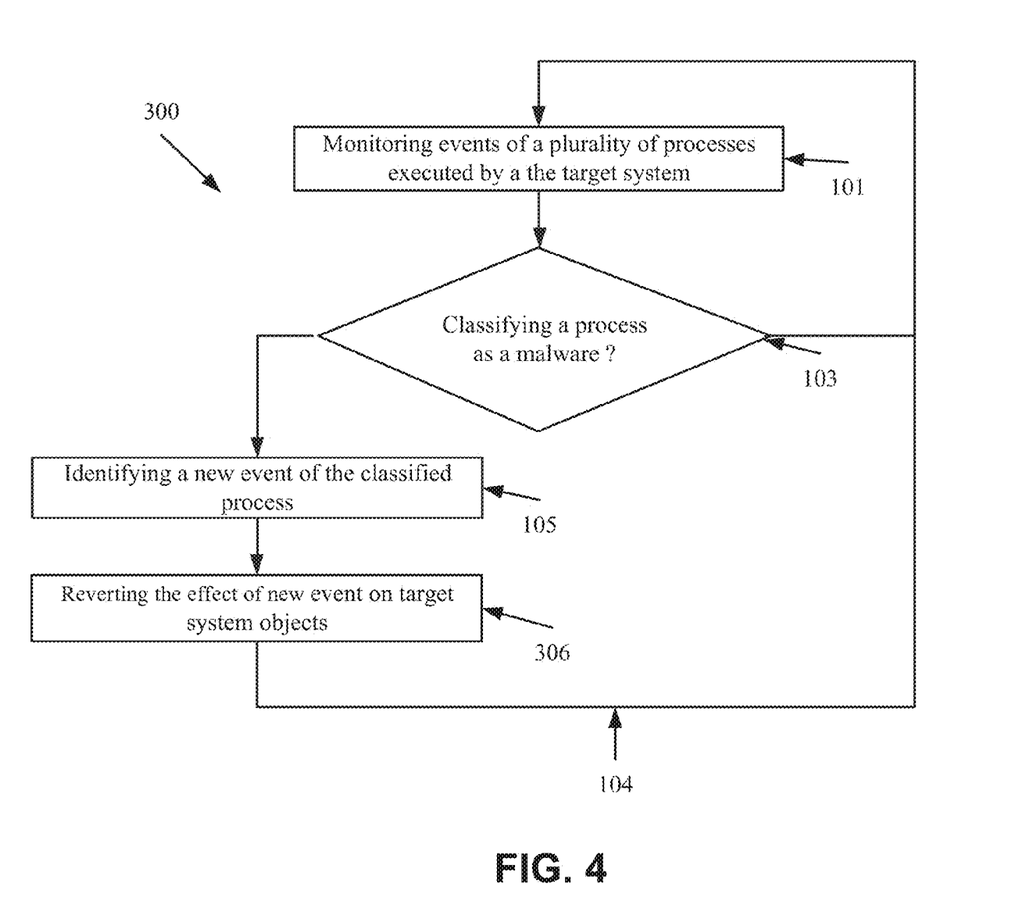
FIG. 4 is a flowchart of a process for selecting a generic operating system object or a specific operating system object for replacing a damaged operating system object, according to some embodiments of the present invention.

Reference is now also made to FIG. 4, which is a flowchart of a method 300 of reverting in run time system object(s), for example files, and/or operating system states, affected by an event of a process classified as a malware, optionally automatically, according to some embodiments of the present invention. Blocks 101 and 103 are as depicted in FIG. 1 and described above; however, as indicted in 305 and 306, in this method 300, when a new event of a process classified as a malware is detected, for example unlogged event, data affected by the new event is reverted in real time, for example edited so as to reflect a state wherein the new event is not executed by the system.

For example, when a score of a process passes a threshold, the data reverting system 200 tags the process as malware. The effect of last event raising the score over the threshold is optionally reverted. Such reverting may be referred to herein as a remediation process. The reverting may be performed by deleting an added file, delete a registry value, disabling the classified process and/or the like.

Optionally, reverting actions (either in the method depicted in FIG. 1 or the method depicted in FIG. 4) depend on the score of the classified process and/or the type of the classified process and/or user's decision. For example, reverting actions at different levels may be authorized and performed as a derivative of the score of the classified process. For instance, the following levels are defined:

Level 1: safe operations unlikely to have an undesired impact on the target system in case of a false positive classification of the process, for instance disabling a non-OS process;

Level 2: operations unlikely to have a negative effect on the target system; however, might harm another software in case of false positive classification, for example deletion of AutoRun entries;

Level 3: relatively dangerous operations that might harm the target system in case of false positive classification, for example deletion of files in OS directories. It should be noted that AutoRun entries are special locations in the file system or the registry wherein the OS executes the listed entries on boot time, for example HKLM\SOFTWARE\Microsoft\Windows\CurrentVersion\Run\.

According to some embodiments of the present invention, reverting operations includes reverting the outcome of a malware consisting of two separate pieces of software, a first that performs actual malware operation(s), and a second that acts as a guard keeping the first installed in the target system, commonly known as a watchdog. In such embodiments, post reverting processes may be executed. For example, any event instructing a recreation of a reverted and/or deleted system object, such as a registry key or a system file, is automatically and preemptively blocked, optionally regardless of the classification or score of the process, thus improving a detection rate and preventing reinfection by the same malware.

In one example, a malware process induces malware events that include regular software events, for example, defining AutoRun variables and system settings. It then proceeds to adding an executable object in a new folder. At this stage, the score of the malware process is below a malware threshold. The malware then proceeds to adding a DLL file in the windows system folder. The predictive score of the suspect process is now above a threshold, indicating that the suspect process is a malware. The system may now block the process from writing the DLL file and then proceeds to creating a procedure to remove the AutoRun entry, restore system settings and delete the new executable, for example as described above. Every system object related to the malware process is detected and handled, for example as described above. A watchdog process that tries to reinstall deleted system objects is blocked and the watchdog process is classified as a malware for blocking and remediation, for instance as described above.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a unit, a module, a network and a malware is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of reverting system data effected by a malware, comprising:
   monitoring, in run time, a plurality of events of a plurality of processes executed by an operating system (OS) running on a computing device:
   logging in an event log, in run time, said plurality of events;
   classifying, in run time, a first process of said plurality of processes as a malware;
   identifying a set of events of said first process from said plurality of events using said event log;
   identifying at least one system object of said OS which is hosted in said computing device and affected by said set of events;
   matching between a signature of said at least one system object and a plurality of signatures of a plurality of system object templates to identify at least one matching system object template of an OS update version suitable to said at least one system object; and
   using said at least one system object template for removing, in response to said classification, an effect of said malware which is caused by said set of events to said at least one system object;
   wherein said removing comprises deleting or modifying a registry value added by said first process;
   wherein said plurality of events comprises a plurality of write commands.

2. The computerized method of claim 1, wherein said classifying comprises calculating a plurality of scores each for another of said plurality of processes according to an analysis of respective associated events from said plurality of events in run time and performing said classifying according to said plurality of scores.

3. The computerized method of claim 2, wherein said removing comprises a reverting action selected according to a score from said plurality of scores of said first score.

4. The computerized method of claim 1, wherein said removing comprises deleting a file added by said first process.

5. The computerized method of claim 1, wherein said removing comprises deleting said at least one system object;

further comprising identifying a regeneration of said at least one system object and preemptively blocking said regeneration.

6. The computerized method of claim 1, wherein said removing comprises disabling said first process.

7. The computerized method of claim 1, wherein said at least one system object template is at least one specific system object template adapted for said OS.

8. The computerized method of claim 1, wherein said at least one system object template is at least one generic system object template adapted for an update version of said OS.

9. A non transitory computer readable medium comprising computer executable instructions adapted to perform the method of claim 1.

10. The computerized method of claim 1, wherein said at least one system object template comprises at least one of a copy of local OS file, a shell setting and a registry setting.

11. The computerized method of claim 1, wherein an effect of said set of events is changing at least one of: domain name service (DNS) setting, a shell setting and a registry setting.

12. The computerized method of claim 1, wherein said at least one system object template is a template of a member of a group consisting of an object file, a registry value, and a setting value.

13. A system of reverting system data effected by a malware, comprising:
   a memory hosting an event log and a code;
   a processor coupled to the memory for executing the code, the code comprising:
   instructions to monitor, in run, a plurality of events of a plurality of processes executed by an installed operating system (OS) running on a computing device and logs said plurality of events in said event log;
   instructions to classify, in run time, a first process of said plurality of processes as a malware and to identify a set of events of said first process from said plurality of events using said event log; and
   instructions to identify at least one system object of said OS which is hosted in said computing device and affected by said set of events;
   instructions to match between a signature of said at least one system object and a plurality of signatures of a plurality of system object templates to identify at least one matching system object template of an OS update version suitable to said at least one system object; and
   instructions to use, in response to said classification, said at least one system object template for removing an effect of said malware which is caused by said set of events to said at least one system object;
   wherein said removing comprises deleting or modifying a registry value added by said first process;
   wherein said plurality of events comprises a plurality of write commands.

14. The system of claim 13, further comprising a generic template database which stores a plurality generic system object templates of a plurality of different versions of an operating system, said processor is adapted to execute said code for selecting at least one of said plurality generic system object templates for a replacement of said at least one system object according to a version of said installed OS.

15. The system of claim 13, further comprising a specific template database which stores a plurality specific system object templates generated to replicate a plurality of different system objects of said installed OS, said processor is adapted to execute said code for selecting at least one of said plurality specific system object templates for a replacement of said at least one system object.

16. A computerized method of repairing damage caused by malware operations, comprising:
monitoring in run time a plurality of events of a plurality of processes executed by an operating system (OS) running on a computing device:
classifying, in run time, a first process of said plurality of processes as a malware by an analysis of a set of events associated with said first process from said plurality of events;
detecting, in run time, an additional event performed by said first process on said computing device; and
identifying at least one system object of said OS which is hosted in said computing device and affected by said set of events;
matching between a signature of said at least one system object and a plurality of signatures of a plurality of system object templates to identify at least one matching system object template of an OS update version suitable to said at least one system object; and
using said at least one system object template for removing an effect of said malware caused by said set of events to said at least one system object;
wherein said removing comprises deleting or modifying a registry value added by said first process;
wherein said plurality of events comprises a plurality of write commands.

17. A computer program product for reverting system data effected by a malware, comprising:
a non-transitory computer readable storage medium;
first program instructions to monitor, in run time, a plurality of events of a plurality of processes executed by an operating system (OS) running on said computing device:
second program instructions to log in an event log, in run time, said plurality of events;
third program instructions to classify, in run time, a first process of said plurality of processes as a malware;
fourth program instructions to identify a set of events of said first process from said plurality of events using said event log; and
fifth program instructions to identifying at least one system object of said OS which is hosted in said computing device and affected by said set of events;
sixth program instructions matching between a signature of said at least one system object and a plurality of signatures of a plurality of system object templates to identify at least one matching system object template of an OS update version suitable to said at least one system object; and
wherein said removing comprises deleting or modifying a registry value added by said first process;
wherein said plurality of events comprises a plurality of write commands;
seventh program instructions to use, in response to said classification, said at least one system object template for removing an effect of said malware caused by said set of events to said at least one system object wherein said first, second, third, fourth, fifth, sixth and seventh program instructions are stored on said non-transitory computer readable storage medium.

* * * * *